Jan. 11, 1966 L. ZERNOW ET AL 3,228,221
APPARATUS FOR FORMING MATERIAL
Filed Sept. 18, 1961 2 Sheets-Sheet 1

INVENTOR.
LOUIS ZERNOW
JOSEPH EDBERG
BY
ATTORNEY

Jan. 11, 1966 L. ZERNOW ET AL 3,228,221
APPARATUS FOR FORMING MATERIAL
Filed Sept. 18, 1961 2 Sheets-Sheet 2
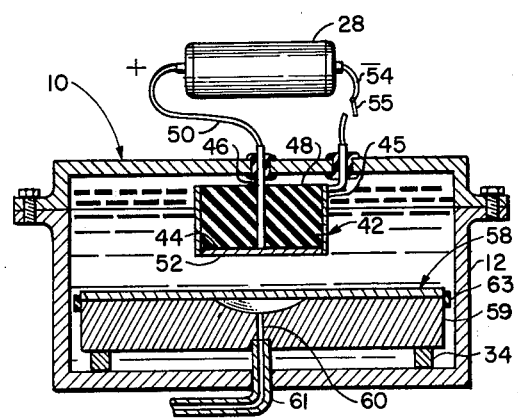
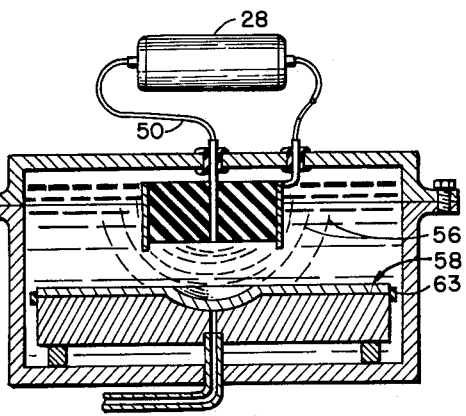
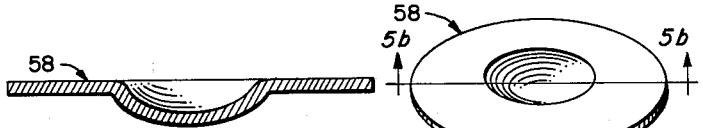
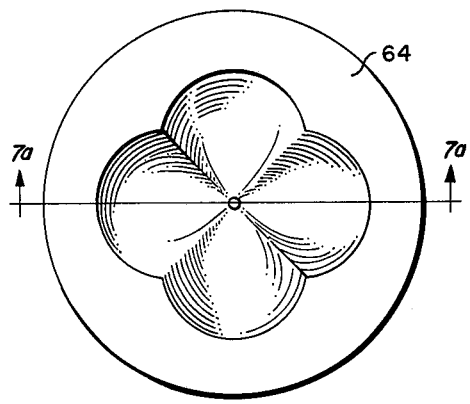
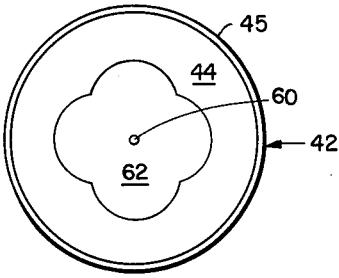
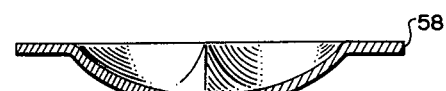
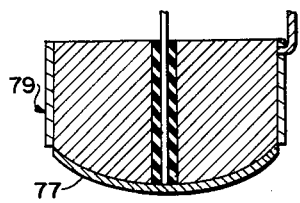
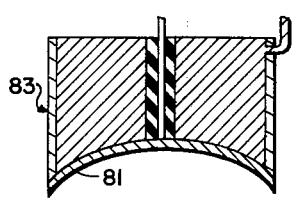
INVENTOR.
LOUIS ZERNOW
JOSEPH EDBERG
BY
ATTORNEY United States Patent Office 3,228,221
Patented Jan. 11, 1966

3,228,221
APPARATUS FOR FORMING MATERIAL
Louis Zernow, Glendora, and Joseph Edberg, Covina, Calif., assignors to Aerojet-General Corporation, Azusa, Calif., a corporation of Ohio
Filed Sept. 18, 1961, Ser. No. 138,959
6 Claims. (Cl. 72—56)

This invention relates generally to material forming, and more particularly to a new and improved method and apparatus for supplying shock energy to form material to a desired shape.

Heretofore shock waves in a shock wave transmitting medium have been directed against material to be formed to force the material, usually metal, into a female die.

For material forming purposes, if the shape of the shock wave used to form the material can be controlled so it is generally similar and parallel to the shape of the female die into which the material is to be forced, the number of shock waves required to perfectly form the material in the die will be minimized. Consequently, the forming operation will be quicker and less expensive.

However, the chemical explosives heretofore used to produce shock waves were often not satisfactory because of inherent limitations in the ability to control the intensity of the shock waves produced. Consequently, when chemical explosives are used in situations where the shock wave intensity cannot be closely regulated, there is danger of injury to the work and the formation of the material in the die requires more frequent explosive shock waves which are expensive and time-consuming.

In addition, depending for example on the chemical composition of the material to be formed, chemical explosives may not be suitable and other methods of supplying shock energy may be required.

What is needed, therefore, and among other things, comprises an important object of this invention, is to provide a method and apparatus for producing shock energy for material forming purposes without the use of chemical explosives.

Another object of this invention is to provide a means for forming a shock wave having any desired shape and intensity for use in material forming processes.

The invention in its broadest aspect comprises connecting a source of electric energy across a thin wire or metal film positioned in a shock wave transmitting medium, gaseous or liquid. The magnitude of the energy generated by the source is such that the wire or film explodes and produces a shock wave in the shock wave medium. This shock wave will have a shape related to the shape of the wire or film. Consequently, a shock wave having any desired shape can be produced by providing a suitably shaped wire or metal film. The intensity of the shock wave can be precisely controlled by regulating the magnitude of the electric energy source and the thickness of the metal film. The shock wave traveling through the medium impacts on the work, usually a metal blank, and this impact is sufficient to force the work into a female die to form it. If the shock wave and the female die are generally similar in shape the metal blank can be formed in the die more perfectly.

These and other objects of this invention will become more apparent when read in the light of the accompanying drawings and specification, wherein:

FIG. 4a is a side sectional view of the apparatus utilizing the principles of this invention and showing a support member with a conductive film deposited thereon, and showing the work blank positioned on a die inside the container;

FIG. 4b is a side view of the container showing the shock wave resulting from the explosion of the film and the work blank forced into the die;

FIG. 5a is a perspective view of the female die used with the apparatus shown in FIG. 4;

FIG. 5b is a side sectional view showing the work blank after the film has been exploded;

FIG. 5c is a perspective view showing the work blank after the film has been exploded;

FIG. 6 is a view of the film receiving surface of a support member with a differently shaped electrically conductive film deposited thereon;

FIG. 7a is a cross sectional view of the finished work blank after the conductive film disclosed in FIG. 6 has been exploded;

FIG. 7b is a plan view of a modified female die for use with the conductive film shown in FIG. 6;

FIG. 8 discloses a metal film deposited on the downwardly convex surface of a support member; and FIG. 9 discloses a metal film deposited on a downwardly concave conductive surface of a support member.

Figure 1:
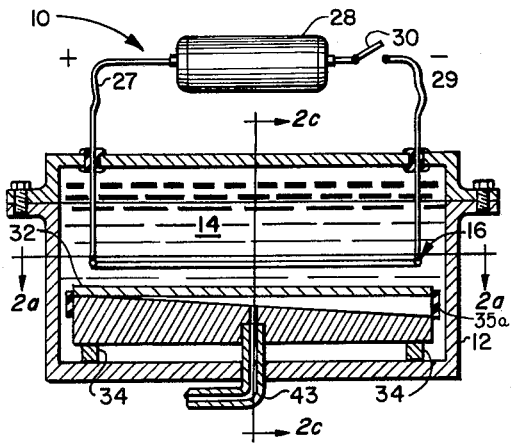
FIG. 1 is a side elevational view of the apparatus utilizing the principles of this invention and showing the relationship between the metal wire to be exploded, the female die, and the work inside the liquid filled container.
Figure 2A:
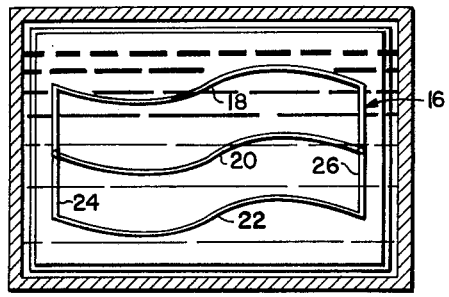
FIG. 2a is a sectional view taken on the line 2a—2a of FIG. 1.

Referring now to FIG. 1 of the drawing, the material forming apparatus indicated generally by the reference numeral 10 comprises a container 12. The container is adapted to hold a shock wave transmitting medium such as water or other liquids or gases. For purposes of illustration, however, the container 12 in this particular embodiment is filled with water 14. A thin or small diameter conductive material indicated generally by the reference numeral 16 is placed in the container (see FIG. 2a). In the embodiment shown, the conductive material comprises a plurality of fine wires 18, 20, and 22. The opposite ends of these wires are connected to substantially thicker and electrically conductive support bars 24 and 26. These bars hold the wires 18, 20, and 22 in any predetermined spaced relation to each other. With this arrangement, the wires can be bent into any desired shape, for reasons to become apparent below. The electrically conductive support bars 24 and 26 are connected to an electric power source indicated generally by the reference numeral 28 by leads 27 and 29 and a control switch 30. The electrical power source may be a conventional circuit for charging a capacitor to a desired high voltage, or it could be an electrical generator with a large current capacity.

It is apparent that when switch 30 is closed, the electrical energy in power source 28 will be connected across the wires 18, 20, and 22. It has been found that if the magnitude of this electrical energy is sufficiently great, the wires will suddenly explode and form a shock wave in the water. It has further been found that the shape of the shock wave resulting from the explosion of the wires will be generally similar to the shape of the wire (see FIG. 2b), and the intensity of the shock wave will be related to the electrical energy in the power source. Consequently, elongated shock waves of any desired shape and intensity can be formed in the water by bending the fine wires 18, 20, and 22 to the shape desired. By way of specific example, it has been found that if a voltage in the range of 1200 to 1600 volts is suddenly connected across a conductive wire approximately .0005 inch in diameter, the wire will explode. Using these values for the voltage level in power source 28 and the thickness of wires 18, 20, and 22 when switch 30 is closed, wires 18, 20, and 22 explode and produce correspondingly shaped shock waves 31. It is apparent, however, that variations in the magnitude of the voltage or the source of electrical energy or the diameter of the wires or conductive material will control the size, shape, and intensity of the shock wave to be formed. In particular, it is contemplated that the wires could be formed from copper, aluminum, zinc, magnesium, tungsten, or other materials in sizes ranging from .0001 inch to 1/8 inch in diameter.

Figure 3A:
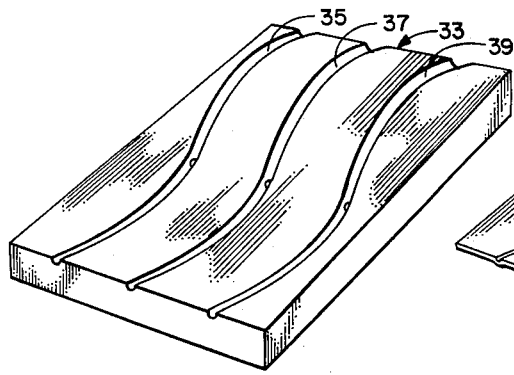
FIG. 3a is a perspective view of the female die used in the apparatus shown in FIG. 1.
Figure 2C:
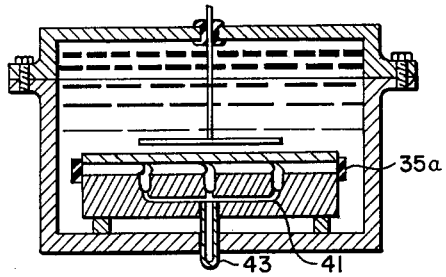
FIG. 2c is a sectional view of the apparatus utilizing the principles of this invention taken on the line 2c–2c of FIG. 1.
Figure 2B:
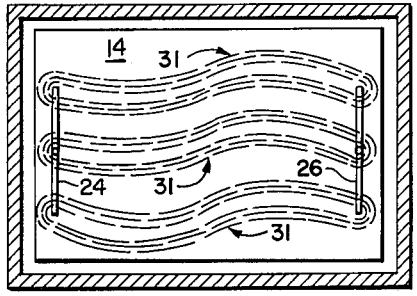
FIG. 2b is a plan view of the interior of the container showing the configuration of the shock waves after the wires are exploded.

The material to be formed, which in this case, is a metal plate, indicated generally by the reference numeral 32 is laid over a female die 33 and is sealed thereon by sealing material 35a to prevent the entrance of the water or other liquid in the container into the interior of the female die (see FIGS. 2c and 3a). In addition, the interior of the female die 33 is evacuated by means of the evacuation pipe 43 which is connected to a vacuum pump (not shown) to permit the impact of the shock wave on the metal blank to force the metal blank into the die.

Figure 3B:
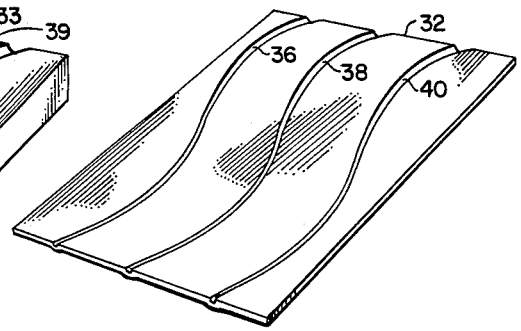
FIG. 3b is a perspective view of the work blank after it is formed.

The female die 33 rests on suitable supports 34 which are designed to hold the metal blank 32 in any suitable position in the container (see FIG. 1). This position is selected so that when the electrical wires 18, 20, and 22 explode, the impact of the shock waves on the surface of the metal blank 32 force it into the recesses 35, 37, and 39 in the female die, thereby producing correspondingly shaped impressions 36, 38, and 40 in the metal blank (see FIG. 3b).

In many circumstances, however, where it is desired to form impressions in material having any desired shape, that is, impressions which are not limited to thin and elongated configurations, another structure is required, as shown in FIG. 4a. In this embodiment, the fine electric wires have been removed from container 12, and in its place is a support member indicated by the reference numeral 42. This support member is here provided with a planar film receiving surface 44 and a conductive sleeve 45. An opening 46 is formed in the support member from top surface 48 to the film receiving surface 44 (see FIG. 4a). A wire lead 50 extends through opening 46 to the film receiving surface 44.

An electrically conductive film 52 ranging from a few molecular layers to approximately 1/32" thick and formed from copper, silver, aluminum, graphite, or other suitable material is deposited by any suitable means on the film receiving surface 44. This film is in electrical contact with lead 50, and with the conductive sleeve 45. In addition, a lead 54 is connected to sleeve 45.

The deposited electrically conductive film can have any desired shape, but for purposes of example in this particular embodiment, the electrically conductive film is circular. Leads 50 and 54 are connected across the source of electrical power 28 described above by closing control switch 55 in lead 54 (see FIG. 4a). With this arrangement, when switch 55 is closed, power from source 28 flows through the electrically conductive film 52. If the magnitude of the energy in the electric power source is great enough it will cause the electrically conductive film to explode and form a shock wave 56 in the water (see FIG. 4b). The resulting shock wave 56 is circular in cross-section because of the generally spherical shape of the conductive film.

In the embodiment shown in FIG. 4a, the material to be formed, indicated generally by the reference numeral 58 is a metal plate, circular in shape (see FIG. 5c). This plate is positioned so it is concentric with the conductive film 52. The metal plate rests on a female die 59, which is provided with a generally spherically and cup-shaped recess in accordance with the shape of shock wave 56 caused by the electrically exploded film (see FIG. 5a). The interior of the female die is provided with a conduit 60 which is connected to an evacuation line 61 to evacuate the die interior. The metal plate 58 is sealed to the die 59 by sealing material 63 to prevent the entrance of water or other liquid in the container into the interior of the die. With this arrangement the impact of shock wave 56 on the surface of the metal plate 58 produces a correspondingly shaped impression therein (see FIGS. 5b and 5c). As stated above, a close correspondence between the shape of the shock wave 56 and the shape of the metal die 59 permits the metal plate 58 to be formed in the die with a minimum number of explosive operations.

It is apparent that by varying the shape of the conductive film and the female die, impressions of any desired shape may be more quickly and accurately formed in the metal plate 58. In particular, using the same structure shown in FIG. 4, but with a differently shaped conductive film 62, as shown in FIG. 6, and a similarly shaped die, 64, as shown in FIG. 7b, a correspondingly shaped impression can be formed in the metal plate 58 (see FIG. 7a).

As shown in FIGS. 8 and 9, the electrically conductive film need not be deposited on a planar film receiving surface. The electrically conductive film 77 shown in FIG. 8, is deposited on the convex film receiving surface of support member 79. In addition, the electrically conductive film 81 is deposited on the downwardly concave film receiving surface of support member 83 (see FIG. 9). The use of a convex or a concave or a combined convex and concave surface upon which a conductive film is deposited permits a wide variation in the shape of the electrically formed shock waves which can be obtained.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. An apparatus for forming an impression of any desired shape in material comprising in combination a container, a shock wave transmitting medium in said container, a support member mounted in said container, said support member having a film receiving surface, a conductive film deposited on said surface, said conductive film adapted to be connected across an electric power source having sufficient energy to explode said conductive film and form a shock wave in said shock wave transmitting medium, a female die having a shape, said conductive film having a shape such that at least a portion of the formed shock wave produced in said shock wave transmitting medium by the explosion of the conductive film has a configuration generally similar to the shape of said die, and means for holding the material to be formed in said container in such a position with respect to said conductive film so that when the electric power source is connected across said conductive film and explodes it, the resulting shock wave impacts on the material to be formed and forces it into said female die.

2. The apparatus set forth in claim 1 wherein said film is composed of aluminum ranging from a few molecular layers to approximately 1/32 inch thick.

3. The apparatus set forth in claim 1 wherein said film is composed of copper ranging from a few molecular layers to approximately 1/32 inch thick.

4. The apparatus set forth in claim 1 wherein said film is composed of silver ranging from a few molecular layers to approximately 1/32 inch thick.

5. The apparatus set forth in claim 1 wherein said film is composed of graphite ranging from a few molecular layers to approximately 1/32 inch thick.

6. An apparatus for forming an impression of any desired shape in material comprising in combination a container, a shock wave transmitting medium in said container, a support member mounted in the container, said support member having a film receiving surface and having an opening extending therethrough to the film receiving surface, an electric wire mounted in the opening, a conductive film deposited on the film receiving surface and in electric contact with one end of said wire in the opening and with conductive means, the opposite end of said wire and said conductive means adapted to be connected across an electric power source having sufficient energy to explode said conductive film and form a shock wave in the shock wave transmitting medium, a female die having a shape, said conductive film having a shape such that at least a portion of the formed shock wave produced in the shock wave transmitting medium by the explosion of the conductive film has a configuration generally similar to the shape of said die, and means for holding the material to be formed in said container in such a position with respect to said conductive film so that when the electric power source is connected across said conductive film and explodes it the resulting shock wave impacts on the material to be formed and forces it into said female die.

References Cited by the Examiner

UNITED STATES PATENTS

| | | | |
|---|---|---|---|
| 39,542 | 8/1863 | Beardslee | 102—28 |
| 2,853,012 | 9/1958 | Rotkin et al. | 102—70.2 |
| 2,935,038 | 5/1960 | Chatten | 113—44 |
| 3,002,457 | 10/1961 | Doughty | 102—28 |

FOREIGN PATENTS 119,435   3/1958   Russia.

OTHER REFERENCES

"Hydrospark Forming Shapes Space-Age Metals," The Tool Engineer, March 1960, pages 81–86.

CHARLES W. LANHAM, *Primary Examiner.*

NEDWIN BERGER, *Examiner.*